United States Patent
Ree

(10) Patent No.: US 8,670,308 B2
(45) Date of Patent: Mar. 11, 2014

(54) METERS WITH MULTIPLE NETWORK INTERFACES

(75) Inventor: Bradley Richard Ree, Cumming, GA (US)

(73) Assignee: General Electric Company, Schenectady, NY (US)

( * ) Notice: Subject to any disclaimer, the term of this patent is extended or adjusted under 35 U.S.C. 154(b) by 89 days.

(21) Appl. No.: 13/367,202

(22) Filed: Feb. 6, 2012

(65) Prior Publication Data

US 2013/0201985 A1    Aug. 8, 2013

(51) Int. Cl.
*H04L 12/28* (2006.01)
(52) U.S. Cl.
USPC ............................. 370/229; 370/254; 702/57

(58) Field of Classification Search
USPC ............. 370/229, 230, 230.1, 254, 328, 389, 370/394, 395.42, 395.5, 395.52, 466, 474; 702/57

See application file for complete search history.

(56) References Cited

U.S. PATENT DOCUMENTS

| | | | |
|---|---|---|---|
| 2011/0035510 A1* | 2/2011 | Alexander | 709/246 |
| 2011/0282497 A1* | 11/2011 | Josephson et al. | 700/276 |
| 2012/0124367 A1* | 5/2012 | Ota et al. | 713/153 |
| 2012/0229296 A1* | 9/2012 | Ree | 340/870.02 |
| 2013/0038467 A1* | 2/2013 | Wang | 340/870.02 |
| 2013/0110621 A1* | 5/2013 | Gupta et al. | 705/14.52 |
| 2013/0191659 A1* | 7/2013 | Ree et al. | 713/310 |

* cited by examiner

*Primary Examiner* — Paul H Masur
*Assistant Examiner* — Michael Phillips
(74) *Attorney, Agent, or Firm* — Fletcher Yoder, P.C.

(57) ABSTRACT

An energy meter system includes an energy meter with metering circuitry that is enabled to collect metrology data relating to energy usage. Communications circuitry in the energy meter is configured to selectively communicate the metrology data to a head end server over an advanced metering infrastructure (AMI) network and a home area network (HAN).

20 Claims, 3 Drawing Sheets

METERS WITH MULTIPLE NETWORK INTERFACES

BACKGROUND OF THE INVENTION

The subject matter disclosed herein relates to meters, and more specifically, to communications for energy meters.

Energy meters are electrical utility meters that may be able to record consumption of electric energy over intervals of time and communicate the recorded information back to the utility providing the electricity. The energy meters may include advanced functionality including the ability to understand when and how power is consumed, introduce advanced power pricing schemes based upon an amount of usage at specific times, etc. Further, the energy meters may provide energy consumers bill estimates, may help to manage use, and/or help reduce energy costs. The energy meters are typically connected through a single network interface, such as an advanced metering infrastructure (AMI), to a head end server. The energy meter is registered with the head end server, and the head end server controls meter reads and other features of the energy meters. Unfortunately, the AMI networks generally provide low-bandwidth communications. Further, the AMI networks typically include a vast number of nodes (e.g., energy meters) that connect to the head end server, thus potentially creating delays of data transmission between the head end server and the energy meters.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, an energy meter system includes an energy meter. The energy meter includes metering circuitry configured to collect metrology data relating to energy usage. Further, the energy meter includes communications circuitry configured to selectively communicate the metrology data to a head end server over an advanced metering infrastructure (AMI) network and a home area network (HAN).

In a second embodiment, a non-transitory tangible computer-readable medium includes executable code. The executable code includes instructions to: obtain metrology data from an energy meter, generate one or more data packets to transmit the metrology data over both an advanced metering infrastructure (AMI) network and a home area network (HAN), determine a priority network interface comprising either the AMI network, the HAN network, or both; and transmit the one or more data packets via the priority network interface.

In a third embodiment, a method of packet communication, includes receiving, at a head end server, one or more packets, wherein the packets are configured to communicate metrology data from a meter over both an advanced metering infrastructure (AMI) network and a home area network (HAN). Further, the method includes interpreting, via the head end server, the one or more packets to identify the meter communicating the metrology data and the metrology data.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. While the current discussion uses energy meters as an example, any such meter may take use of the techniques of the current disclosure. For example, other utility meters such as a water meter may take advantage of the currently described techniques. Further, energy meters may relate to electricity, gas, or other types of meters.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments relate to a communications packet structure that enables meters to communicate data using multiple network interfaces. Such a packet structure may enable an energy meter to communicate information in new ways, such that congestion on highly-utilized energy meter networks (e.g., the advanced metering infrastructure) may be alleviated. Further, transmission via alternative networks may increase data transmission efficiency, reduce transmission costs, and increase data bandwidth.

Figure 1:
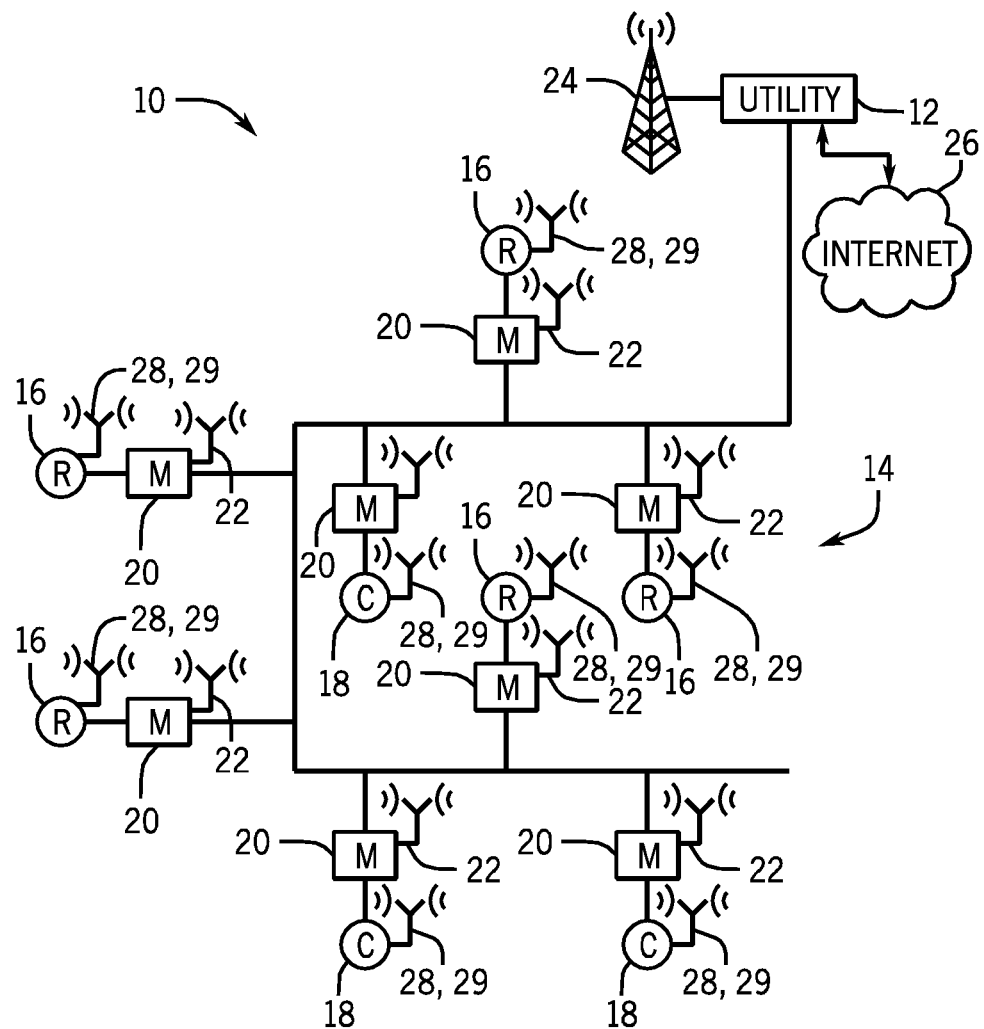
FIG. 1 is a block diagram of an embodiment of an electrical distribution system that employs an AMI network and a Home Area Network (HAN)

With the foregoing in mind, FIG. 1 represents a block diagram of an electrical system 10, which includes a power utility 12 that supplies power to a power grid 14. Loads on the power grid may include, for example, residential establishments 16 and commercial establishments 18. The power consumption of the residential establishments 16 or commercial establishments 18 may be monitored by energy meters 20. The electrical system 10 may be enabled to communicate information from the residential and commercial establishments 16 and 18 to the power utility 12 via multiple pathways (e.g., an advanced metering infrastructure and through a networked internet connection from the residential and commercial establishments 16 and 18). By enabling communications via multiple pathways, data communications may become more reliable through redundant connections and/or selecting a path with better tradeoffs based upon communication preferences.

In certain embodiments, the energy meters 20 may be monitored on-site to monitor power consumed by the residential establishments 16 or the commercial establishments 18. Additionally, the energy meters 20 may communicate with the power utility 12 (e.g., a head-end server of the power utility 12) via data communication links 22 (e.g., an Advanced Metering Infrastructure (AMI) link). Such data communication links 22 may be wired (e.g., over wired telecommunication infrastructure) or wireless (e.g., a cellular network or other wireless broadband, such as WiMax). Similarly, the power utility 12 may employ a communication link 24 to communicate with the various energy meters 20. The communication link 24 may be wired or wireless, as may suitable to communicate to the various communication links 22 of the energy meters 20. The residential establishments 16 and/or the commercial establishments 18 may be enabled to communicate with a computer network (e.g., a home area network (HAN) 29 (e.g., a Wifi and/or Zigbee network) wired and/or wirelessly connected to the Internet 26) via a communication link 28. The power utility 12 may be enabled to send and/or receive data through the computer network(e.g., Internet 26), through the communication link 24, and/or other communication links.

As will be described in more detail below, the energy meters 20 may be enabled to selectively send and/or receive data from the power utility 12 via the communication links 22, the computer network (e.g., Internet 26) via communication links 28, or both. Such data may include metrology data such as an amount of consumed energy, a time of use of energy, etc. As discussed above, by providing additional data communication pathways, one or more pathways may be selected to communicate the data through, for many different reasons. For example, the communication links 22 may be more persistent than the communication links 28, providing a more reliable connection. However, such communication link 22 may be more costly, may provide less bandwidth, and/or may take longer to transmit data to the head-end server (e.g. power utility 12). Thus, the communication pathway may be varied, depending on the data transmission goals. For example, data communications link 22 may be selected when reliability or persistence of communication is preferred over cost, time, etc. Further, data communications links 28 may be selected when faster transmission times and/or increased bandwidth is preferred over a more persistent connection.

Figure 2:
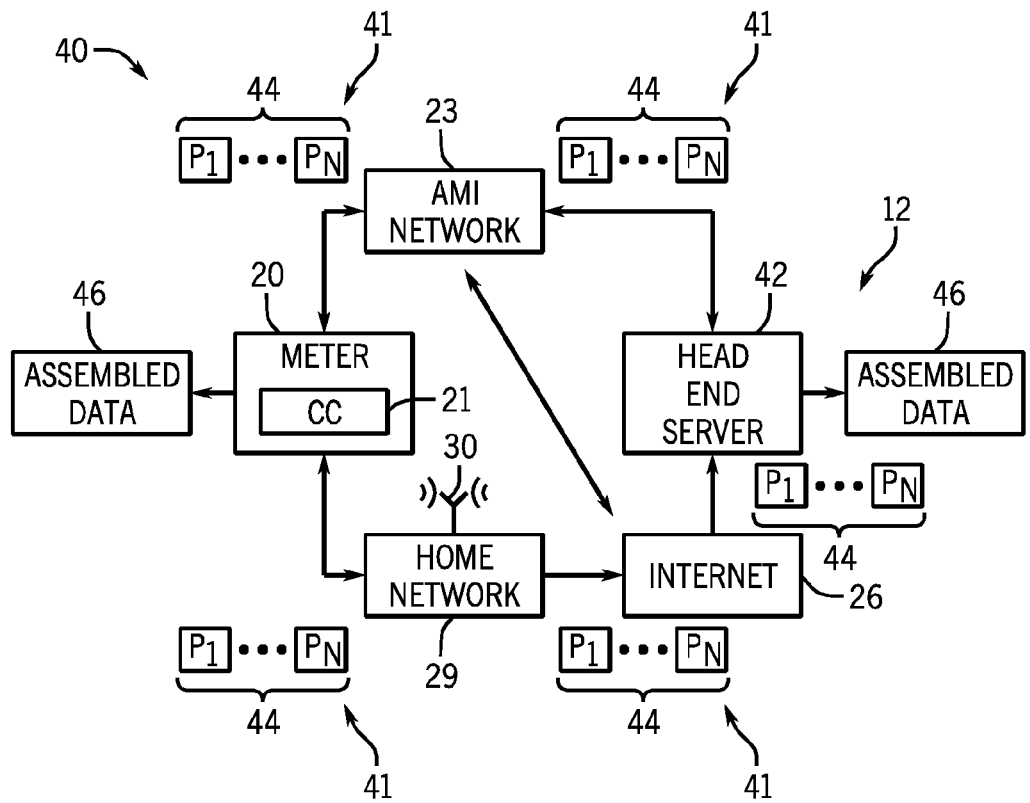
FIG. 2 is a block diagram illustrating an embodiment of a system having packet communications between an energy meter and a head end server.

FIG. 2 is a block diagram illustrating an embodiment of a communication system 40 having packet communications 41 between an energy meter 20 and the head end server 42. As previously discussed, it may be useful to provide multiple communication pathways between the energy meter 20 and the head-end server 42. To enable communications between the energy meter 20 and the head-end server 42 over multiple communication pathways, the energy meter 20 may include circuitry 21 (e.g., communications circuitry) configured to communicate data (e.g., metrology data, energy meter 20 identification data, or both) to the head-end server 42 via one or more data packets 44. Each of the data packets 44 may include a segment of the data to be communicated to the head-end server 42. As will be discussed in more detail below with regards to FIG. 3, the data packets 44 may be structured such that the one or more packets 44 may be sent and/or received via the AMI network 23, the Home Area Network (HAN) 29, or both without customizing the packet 44 for the type of network that the packet travels through. In certain embodiments, the HAN 29 includes a communications module 30 that enables communications between the energy meter 20 and the HAN 29. For example, the communications module 30 may include a radio frequency device that enables radio-frequency communications between the energy meter 20 and the HAN 29. As illustrated, the HAN 29 and/or the AMI network 23 may be connected to the Internet 26, which may be connected to the head-end server 42. In some embodiments, the AMI network 23 may connect directly to the head-end server 42 without an Internet 26 connection. The connection between the Internet 26 and the HAN 29 and/or AMI network 23 (when connected to the Internet) may utilize the Internet Protocol (IP) to communicate data to the head-end server 42. In many HAN 29 configurations, a router or other device enables communication between devices on the HAN 29 and the Internet 26. In such configurations, the router or other devices may provide network address translation (NAT) on packets 44, such that packets sent in response to the NAT packets may be properly routed to the proper device on the HAN 29. As will be described in more detail below, the energy meter 20 packets 44 described herein include a unique identifier or source identifier that provides identification of the energy meter 20 that is providing the transmitted data. Such information may be used by the head-end server 42 to identify and associate packets 44 of data received from the AMI network 23 and/or the HAN 29 with a specific energy meter 20. The packets may be configured such that the unique identifier is unaltered by the NAT process of the router or other device.

The packets 44 may be transferred via the AMI network 23, the HAN 29, or both to the head-end server 42 in a synchronous or an asynchronous manner. The head-end server 42 may receive, order, and assemble the data packets 44 such that the data 46 (e.g., metrology data) sent from the energy meter 20 may be interpreted. Further, the data 46 may include information relating to the communications pathway (e.g., the AMI network 23 and/or the HAN 29) that was used to transmit the packets 44.

Figure 3:
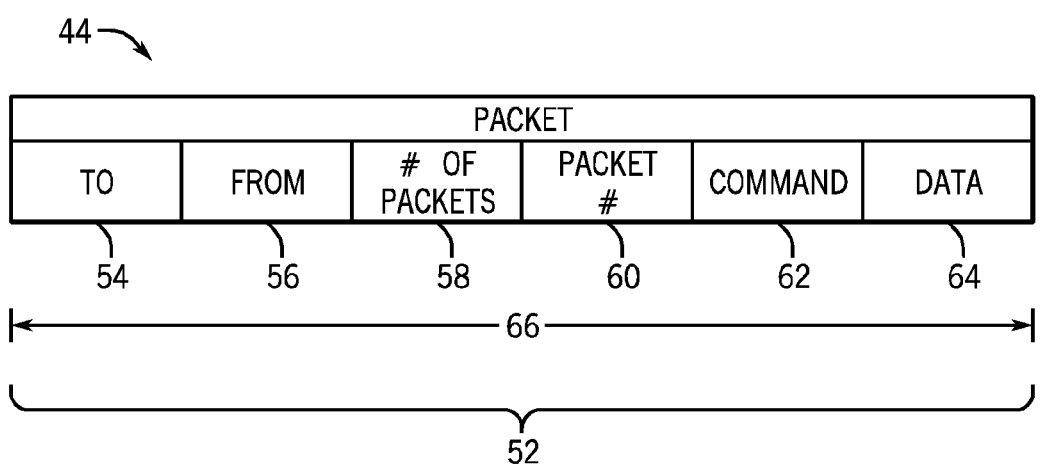
FIG. 3 is a diagram illustrating an embodiment of the packet communications of FIG. 2.

In addition to providing a segment of the data to be communicated to and/or from the head-end server 42 and/or the energy meter 20, each packet 44 may provide additional structured information, such that each of the packets 44 may be interpreted and assembled at their destination (e.g., head end server 42). For example, FIG. 3 illustrates one embodiment of a packet 44, including a pre-defined packet structure 52. The packet 44 may include the packet structure 52 that provides a standard placement and definition of adata containers within the packet, such thaat the packet 44 may be interpreted at their destination. While a particular ordered packet structure 52 is provided in FIG. 3, the present discussion should not be read as limiting the packets 44 to the presently described packet structure 52.

The packet structure 52 may include a "TO" container 54, a "FROM" container 56, a "NUMBER OF PACKETS" container 58, a "PACKET NUMBER" container 60, a "COMMAND" container 62 and/or a "DATA" or payload container 64. In certain embodiments, the packets 44 may have a predetermined size 66, or the packets 44 may have a variable size 52 that is described in a "PACKET LENGTH" container. For example, the size 66 may be equal to or greater than 32, 64, or 128 bits of data. Depending on the amount of data to be sent to the destination and/or the bandwidth of the communication pathway chosen to communicate the data, the data may be segmented into any number of packets 44. For example, when a large amount of data needs to be transferred and/or the bandwidth of the communication pathway is low, the number of packets may increase. Further, when a relatively small amount of data and/or the bandwidth of the communications pathway is relatively large, a smaller number of packets may be utilized.

The "TO" container 54 may house a recipient address for the packet 44. For example, when packets 44 are sent from the head-end server 42 to the meter 20, the "TO" container 53 may house an address that points to the meter 20. When the meter 20 provides packets 44 to the head-end server 42, an address pointing to the head-end server 42 may be used. In certain embodiments, the recipient address may be between one and six bytes of data.

The "FROM" container 56 may house an address that points to the device sending the packet 44. For example, when an energy meter 20 sends packets 44 to the head-end server 42, the "FROM" containers 56 in the packets 44 may be populated with an address or other identifying data relating to the energy meter 20. Packets 44 sent from the energy meter 20 may include a unique identifier of the energy meter 20 in the "FROM" container. For example, in some embodiments, the unique identifier may include an organizationally unique identifier (OUI) that identifies the energy meter 20. An OUI is a identifier purchased from the Institute of Electrical and Electronics Engineers, Incorporated (IEEE) Registration Authority. The OUI may be 24 bits, and thus, the "FROM" container 36 may be greater than 24 bits. Typically, energy meters 20 may be associated with a serial number provided by the manufacturer of the energy meter 20. Further, each energy meter 20 is often times associated with a specific customer account at the power utility 12. In certain embodiments, the unique identifier stored in the "FROM" container 36 may include such a serial number of the energy meter 20, such a customer account number associated with the energy meter 20, or both. Thus, in certain embodiments, the "FROM" container may utilize fewer bits of data associated with unique identifiers, customer account numbers, etc. as compared to the number of bits of data associated with a network address of the energy meter 20. In some embodiments, the unique identifier may be pre-determined or programmed into the energy meter 20. In other embodiments, the unique identifier may be assigned and obtained by the power utility 12 (e.g., via the head-end server 42). For example, the head-end server 42 may provide the energy meter 20 with the customer account number associated with the energy meter 20, such that the customer account number may be included in the unique identifier of the energy meter 20.

Each packet 44 may also include a "COMMAND" container 62. The "COMMAND" container 62 may include interpretable data requests or other instructions for the receiving system (e.g., a head-end server 42 or energy meter 20 that receives communicated packets 44). For example, the head-end server 42 may send one or more packets 44 to the energy meter 20, wherein the packets 44 include commands to provide energy meter readings to the head-end server 42. In certain embodiments, the "COMMAND" container 62 of each packet may utilize 8 bits of data in the packets 44.

Further, each packet 44 may include a "DATA" or payload container 64. The "DATA" container 64 houses a segment of data that is to be communicated to the receiving system. For example, metrology data provided by the energy meter 20 may be segmented into N segments and placed in the "DATA" containers 64 of N packets 44. The size of the "DATA" containers 64, and thus the size of the data or payload that may be placed inside the "DATA" containers 64 may vary based upon a number of factors. For example, if large amounts of data or a large number of data communications are anticipated, the "DATA" containers 64 may be large, such that fewer packets 44 may be utilized. In situations where small amounts of data or a small number of communications are anticipated, the "DATA" containers 64 may be reduced. The size of the "DATA" containers 64 may be fixed or variable. In embodiments where the "DATA" containers 64 are variable, the receiving system may determine the size of the "DATA" containers 64 by interpreting a "DATA SIZE" value included in the packet 44 or by determining the size based upon the known size of the packet 44 and the known sizes of the other containers within the packet 44.

As previously discussed, upon reaching their destination, the packets 44 may be reassembled such that the complete data set communicated through the packets 44 may be interpreted. For example, as illustrated in FIG. 2, N packets 44 may be transmitted between the energy meter 20 and the head-end server 42. By assembling all N packets 44, the data may be interpreted as assembled data 46 at the destination (e.g., head-end server 42 and/or energy meter 20). As packets 44 are sent to their destination, they may be sent without the need to send the packets in order. Indeed, in some embodiments, the packets 44 will be sent and/or received asynchronously, or without any regard to the order of the packet 44 with respect to the other data packets 44. Thus, it may be useful to communicate the number of packets 44 and the current packet 44's packet position (or number) with regard to the entire set of packets 44 to assemble the data. Therefore, each data packet 44 may include a number of packets in the "NUMBER OF PACKETS" container 58 and an assigned packet number housed in the "PACKET NUMBER" container 60. Based upon the number of packets and the packet number, a system (e.g., the head-end server 42 and/or the energy meter 20) may assemble the data packets 44 to interpret the assembled data 46. For example, the head-end server 42 may determine that 10 packets 44 of data are being sent to provide a set of assembled data 46 by interpreting the value in the "NUMBER OF PACKETS" container 58 in the packets 44. Further, the head-end server 42 may determine an ordering of the received packets 44 by interpreting the value in the "PACKET NUMBER" container 60 of the packets 44. Based upon the determined order, the head-end server 42 (or other packet receiving system) may order the packets 44. When all 10 packets 44 are received, the system may interpret the assembled data 46.

Figure 4:
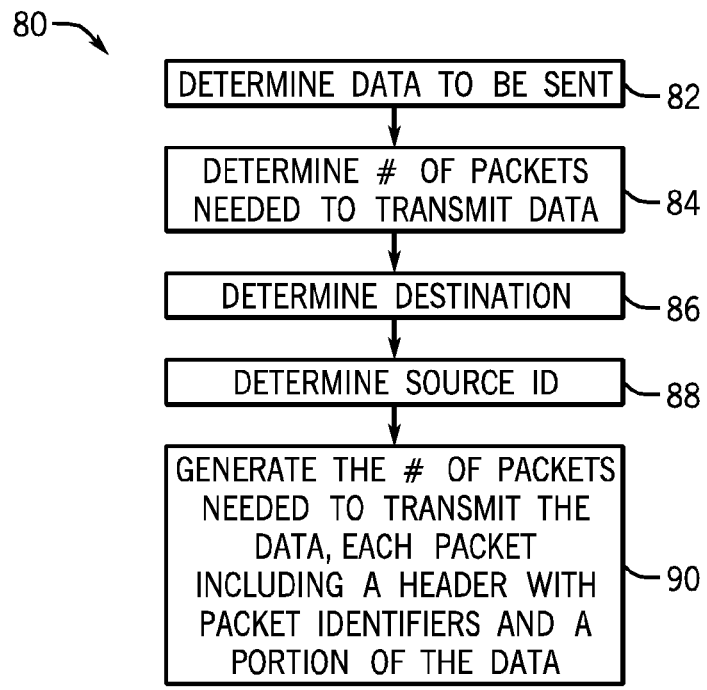
FIG. 4 is a flow diagram illustrating an embodiment of a packet generation process.

Turning now to a discussion of how the packets 44 are generated, FIG. 4 illustrates a flow diagram depicting a packet generation process 80, in accordance with an embodiment. This process 80 may be provided via computer-readable execution instructions stored in a non-transitory, tangible, computer-readable medium (e.g., memory or storage) of a system that sends packets 44 (e.g., the head-end server 42 and/or the energy meter 20). The sending system (e.g., the head-end server 42 and/or the energy meter 20) may identify data for transmission that is to be sent to a recipient system (e.g., the head-end server 42 and/or the energy meter 20) at block 82. In certain situations, such information may be determined based upon a command to provide data to the recipient system (e.g., a request for data from the recipient system and/or pre-programmed instructions on the sending system to provide data to the recipient system).

The sending system then determines the number of packets 44 appropriate for the transmission of data to the recipient system at block 84. For example, the "DATA" or payload container 64 may be fixed at 100 bits of data. The data to be sent may be 1000 bits large. Thus, the sending system may determine that 10 packets 44 may be appropriate to send all 1000 bits of data. In embodiments where the "DATA" container 64 size may vary, the sending system may utilize other efficiency algorithms to determine desirable "DATA" container 64 sizes and use the determined sizes to determine the number of packets 44 appropriate to provide the data to the recipient system.

The sending system determines the destination of the data in block 86. In some embodiments, the destination information may be determined based upon one or more previous packets 44 sent with command information that triggered the sending of the data from the sending system. For example, if the head-end server 42 requests metrology data from the energy meter 20 via one or more packets 44, the energy meter 20 may utilize the "FROM" container 36 of the packets 44 to determine a response destination.

The sending system then determines a unique identifier or source identifier, as discussed above, such that the recipient system is notified of the system sending the data at block 88. For example, the sending system may determine that the unique identifier includes the serial number of the sending system, a customer account number associated with the sending system, an OUI, etc.

The sending system then generates the number of packets 44 based upon the determined number of packets appropriated to transmit the data at block 90. Each packet 44 may be populated with data useful for communications and assembly of the packets 44. For example, the determined number of packets 44 appropriate to transmit the data may be placed in the "NUMBER OF PACKETS" container 58. Further, a packet identification number associated with the order of the packet 44 may be placed in the "PACKET NUMBER" container 60. The determined destination may be placed in the "TO" container 54 and the determined source identifier, or unique identifier, may be placed in the "FROM" container 56. Further, any commands for the recipient system may be placed in the "COMMAND" container 62. Additionally, the data to be communicated may be segmented and placed in the "DATA" or payload containers 64 of the packets 44.

As discussed above, the packet structure defined herein enables packets 44 to be sent and/or received via a plurality of networks (e.g., 2, 3, 4, 5, or more), such as both the AMI 23 and the HAN 29. In certain embodiments, it may be desirable to send data via both the AMI 23 and a HAN 29. For example, providing data via multiple communication pathway may provide data redundancy when the data is communicated via two or more communication pathways to the head-end server 12. For example, when data may be communicated via a HAN 29 (e.g., Zigbee or Wifi connected to the Internet) and the AMI 23, the data may be communicated via both communication pathways. In the event that the data transmission fails via the HAN 29, the data transmission via the AMI 23 may still enable the complete data package to reach the recipient system.

Figure 5:
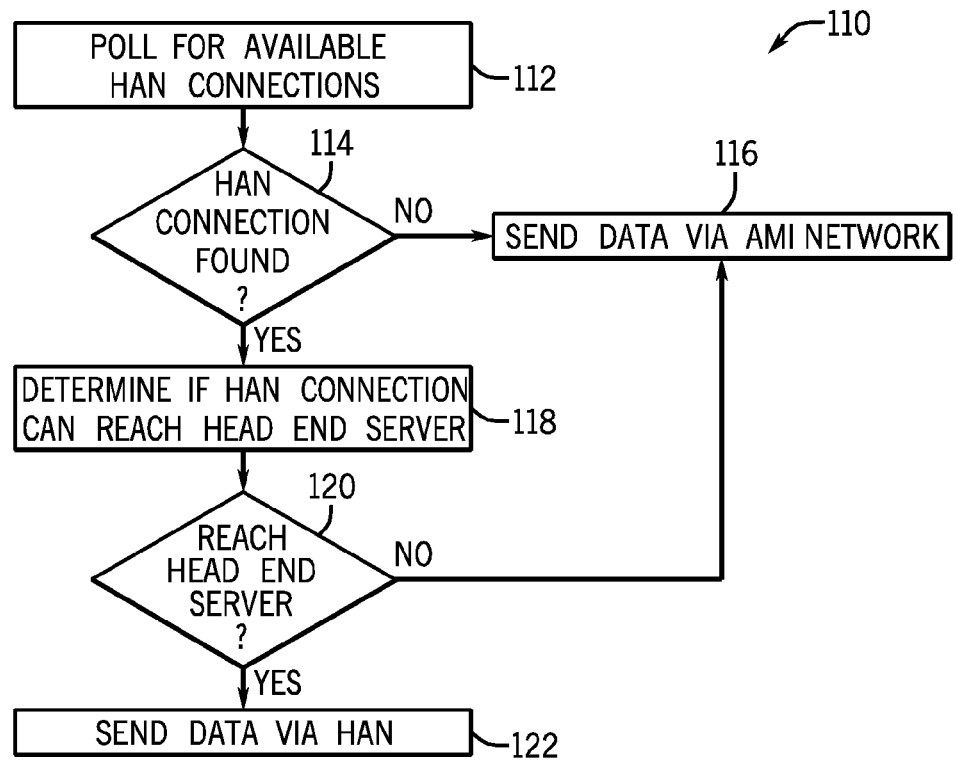
FIG. 5 is a flow diagram illustrating an embodiment of a priority network determination process.

In other embodiments, it may be beneficial to choose one priority network (e.g., either the AMI 23 or the HAN 29) to provide the data, leaving the other networks as secondary networks when the priority network is unavailable. In some embodiments, a prioritized ordering of each of the networks may be provided (e.g., Network 3 has top priority, Network 1 has a second priority, and Network 2 has a third priority). FIG. 5 is a flow diagram illustrating an embodiment of a priority network determination process 110. It is important to note that this is only one example of how a priority network may be determined. This discussion on the priority network determination is not intended to limit any approach to determining which network should be given priority. For example, in some embodiments, alternative priority network determinations may be made based upon data transmission cost variations, bandwidth variations, transmission time variations, etc.

As discussed above, it may be beneficial to prioritize sending data through a HAN 29 connection when such a connection exists. Typically, AMI 23 networks have a relatively low bandwidth used by a high number of energy meter nodes. The lack of available bandwidth along with the high number of nodes may often lead to congestion or bottle-necks in the AMI 23. A HAN 29 may provide a communications pathway with relatively more bandwidth and fewer energy meter nodes. Thus, by sending the packets over the HAN 29 versus the AMI 23, the packets may be communicated with less network congestion. Further, by communicating over the alternative pathway, the congestion of the AMI 23 may be reduced, by reducing the amount of communication over the AMI 23. Thus, the network determination process 110 of FIG. 5 may prioritize a HAN 29 over an AMI 23 connection. In block 112, upon preparing to send data, the sending system (e.g., the energy meter 20) polls for available HAN 29 connections. At decision block 114, if no HAN 29 is detected, the data is sent through packets 44 on the AMI 23 (block 116). If however, a HAN 29 is detected in decision block 114, the sending system may determine whether the HAN 29 connection can reach the head-end server 42 (block 118). For example, the sending system may send a test packet of data to the head-end server and wait for a response from the head-end server 42. Alternatively, the sending system may merely determine whether an internet connection is available via the HAN 29 and assume that the HAN 29 will be able to reach the head-end server 42. At decision block 120, if the sending system determines that the HAN 29 cannot reach the head-end server 42, the data is sent via the AMI 23 (block 116). If however, the sending system determines that the HAN 29 can reach the head-end server 42, the data is sent via the HAN 29 (block 122).

While the above discussion notes that the sending system determines the priority network utilized to communicate the data, it is important to note that any other intermediary device may determine the priority network. For example, the sending system may provide the packets to a computer system, router, or other device that determines which network to send the packets through. Further, although the above description illustrates an embodiment where a HAN 29 is the priority network, in some embodiments, the AMI 23 may be the priority network.

Technical effects of the invention include a system that provides multiple data communication pathways between an energy meter and a head-end server of a power utility. By enabling communication through multiple pathways, increased reliability and effectiveness in data transmission may occur. For example, providing multiple pathways may result in data transmission redundancy by providing two or more different transmission pathways to reach the head-end server. Further, in some embodiments, enabling multiple data communication pathways may result in more efficient communication. For example, in some embodiments, the data transmission pathway may be chosen to reduce the cost of a transmission, provide more reliable transmissions by selecting a higher bandwidth connection when such bandwidth would be useful in data transmission, and/or transmit data in a more timely fashion.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An energy meter system, comprising:
an energy meter, comprising:
metering circuitry configured to collect metrology data relating to energy usage; and
communications circuitry configured to:
communicate the metrology data to a head end server over an advanced metering infrastructure (AMI) network and a home area network (HAN) based upon a first condition;
communicate the metrology data to the head end server over the AMI network based upon a second condition; and
communicate the metrology data to the head end server over the HAN based upon a third condition.

2. The energy meter system of claim 1, wherein the communications circuitry is configured to communicate the metrology data via one or more data packets.

3. The energy meter system of claim 2, wherein the one or more data packets comprise a unique identifier configured to identify the energy meter.

4. The energy meter system of claim 3, wherein the unique identifier comprises an organizationally unique identifier (OUI).

5. The energy meter system of claim 3, wherein the unique identifier comprises a serial number of the energy meter, a customer account number associated with the energy meter, or both.

6. The energy meter system of claim 3, wherein the unique identifier is obtained from the head end server.

7. The energy meter system of claim 3, wherein the one or more packets are configured to retain the unique identifier after network address translation (NAT) has been performed on the packets.

8. The energy meter system of claim 1, comprising the head end server.

9. The energy meter system of claim 8, wherein the head end server is configured to:
receive the one or more data packets via the AMI network, the HAN, or both; and
interpret the packets to identify the energy meter, the metrology data, or both.

10. The energy meter system of claim 1, wherein the HAN comprises:
radio-frequency communications between the energy meter and a HAN communications module; and
Internet Protocol communications between the HAN communications module and the head end server.

11. A non-transitory tangible computer-readable medium comprising executable code, wherein the executable code comprises instructions to:
obtain metrology data from an energy meter;
generate one or more data packets to transmit the metrology data over both an advanced metering infrastructure (AMI) network and a home area network (HAN) to a head end server;
determine a priority network interface comprising: the AMI network under a first condition, the HAN network under a second condition, and both under a third condition; and
transmit the one or more data packets via the priority network interface to the head end server.

12. The non-transitory tangible computer-readable medium of claim 11, wherein the instructions to determine the priority network interface is based upon a determination of whether the energy meter is connected to the HAN.

13. The non-transitory tangible computer-readable medium of claim 12, wherein the instructions to determine the priority network interface comprise instructions to select at least the HAN network as the priority network interface when the energy meter is connected to the HAN.

14. The non-transitory tangible computer-readable medium of claim 11, wherein the one or more packets comprise a meter identifier, a command, and a payload.

15. The non-transitory tangible computer-readable medium of claim 14, wherein the meter identifier comprises at least 24 bits of the packet, the command comprises at least 8 bits of the packet, and the payload comprises a fixed number of the remaining bits of the packet.

16. The non-transitory tangible computer-readable medium of claim 14, wherein the meter identifier comprises an organizationally unique identifier (OUI).

17. The non-transitory tangible computer-readable medium of claim 11, wherein the instructions to determine the priority network is based upon at least one of cost variations, bandwidth variations, or time variations between the AMI network and the HAN.

18. A method of packet communication, comprising:
transmitting one or more packets between an energy meter and a head end server, wherein the one or more packets are configured to:
communicate metrology data from the energy meter over:
an advanced metering infrastructure (AMI) network under a first condition;
a home area network (HAN) under a second condition; and
both the AMI network and the HAN under a third condition;
wherein the one or more packets comprise unique identifiers to identify the energy meter.

19. The method of claim 18, comprising transmitting the one or more packets over the AMI network, the HAN, or both via the Internet.

20. The method of claim 18, comprising transmitting the one or more packets via the HAN, wherein the HAN comprises radio-frequency communications between the energy meter and the HAN.

* * * * *